Patented Apr. 25, 1939

2,156,130

UNITED STATES PATENT OFFICE 2,156,130

COMPOSITIONS FOR FLUID TRANSMISSION OF POWER

William Percival Smith, London, England

No Drawing. Application July 17, 1937, Serial No. 154,319. In Great Britain November 18, 1933

2 Claims. (Cl. 252—5)

This invention relates to compositions for fluid transmission of power, and the present application is filed as a continuation in part of my application for patent for improvements in or relating to compositions for fluid transmission of power, Serial No. 743,011, filed September 6, 1934.

Recent developments in the design of fluid pressure brakes in automobiles have imposed more exacting conditions on fluid transmission compositions in that such compositions are required to stand a much higher temperature than formerly and many compositions hitherto found suitable for this purpose have been found to vapourize at the temperatures to which they are now subjected, and it is one object of this invention to provide a liquid with an unusually high vapourizing point while retaining the properties which are well known to be essential for these liquids, such as low freezing point, constant viscosity over a large range of temperature and absence of action on the metal and rubber parts of the mechanism.

Castor oil, on account of its constant viscosity over a wide range of temperatures has been used largely as a fluid for transmission of power, in particular in fluid braking systems, and in order to overcome as far as possible the alleged detrimental effect of castor oil upon the rubber parts of the mechanism, alcohol has been added to the castor oil.

It has also been proposed to incorporate with castor oil certain esters of the type of di-butyl-phthalate with a view to obtaining a solution which is more stable and gives a more constant viscosity of the castor oil with change of temperature.

I have now found that the acetic acid esters of polyhydric alcohols are pre-eminently suitable as constituents for brake fluids and liquids for other fluid transmission systems because the resultant liquid will remain in the liquid state down to a very low temperature and will withstand very high temperatures without appreciable vapourisation.

I have found that certain of the polyhydric alcohol acetic acid esters are compatible with castor oil in considerable proportions without the aid of a solubilising agent. Triacetin, however, and the glycerol esters generally are only compatible with castor oil in very minute proportions, and while it is probable that such solutions will have little or no advantage over castor oil alone as a fluid for power transmission, it is possible to obtain compatible solutions of glycerol acetic acid esters generally with castor oil, even though in certain cases the quantity of acetic acid ester may be very minute.

Accordingly, the present invention provides a liquid for transmission of power consisting of castor oil, and an acetic acid ester of polyhydric alcohol containing before esterification not more than three hydroxyl groups in the molecule; the proportion of polyhydric alcohol ester being such as to give a compatible solution with the castor oil.

The compositions according to the invention may be prepared simply by mixing the ingredients, but in some cases it may be desirable to heat the solution to a temperature of not more than 100° C. when making the mixture.

The acetic acid esters which are of greater utility for the purpose of the present invention are the glycol diacetates, in particular, butylene glycol diacetate.

The following specific examples of brake fluids are typical embodiments of the present invention, but while I have described my invention as applicable to fluid brake systems, it is to be understood that my invention includes liquids equally applicable to fluid power transmission means other than those used in brakes. The proportions given are by volume.

Example 1

| | Per cent |
|---|---|
| Castor oil | 50 |
| Butylene glycol diacetate | 50 |

The above mixture may be heated to a temperature of about 150° C. without fear of gassing. In fact butylene glycol diacetate distils in bulk at 204° to 210° C. but as commercially prepared small fractions will vaporize below the latter range of temperature. The above fluid however has been found to withstand a temperature of −26° C. for a prolonged period of time.

Example 2

| | Per cent |
|---|---|
| Castor oil | 85 |
| Glycol monoacetate | 15 |

Glycol monoacetate will mix with castor oil up to 30% by volume showing signs of separation only after prolonged standing at room temperatures. By applying heat, however, it is possible to obtain a higher proportion of mono-acetate in solution, but this is not desirable if all danger of a detrimental degree of separation at low temperatures is to be avoided. The amount of separation observed in a mixture containing 25% glycol monoacetate after 28 days at room temperature is not detrimental. The particular mixture given above is recommended where a relatively high viscosity at normal working temperature is desirable and low temperatures are not encountered.

In the above examples, the pharmaceutical quality castor oil has been found satisfactory, although any suitable neutralising operation may be carried out upon such of the compositions as are improved by this treatment. "Blown" or miscible oils are of high acidity and have no corresponding advantages.

Anticorrosion agents, colouring matter and special additions for the purpose of obtaining exceptionally low freezing points or to form a protective coating as a residue when the brake fluid is evaporated by over-heating, may be added to the compositions according to the invention.

It will be appreciated that mixtures of acetic acid esters may be employed according to the present invention so long as the proportion of the acetic acid ester mixture to castor oil is such that a compatible solution is obtainable without the aid of a solubilising agent.

What I claim is:

1. A liquid for transmission of power consisting of butylene glycol diacetate and castor oil; the proportion of butylene glycol diacetate being such as to give a compatible solution with the castor oil.

2. A liquid for transmission of power consisting of butylene glycol diacetate and castor oil in equal proportions by volume.

WILLIAM PERCIVAL SMITH.